Figure 1:
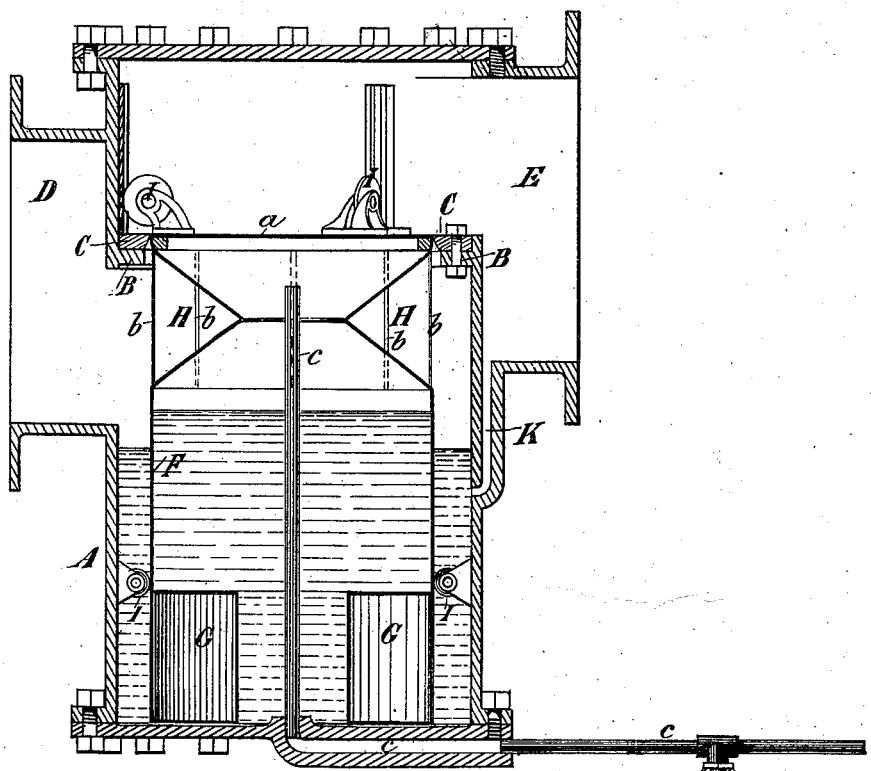

2 Sheets—Sheet 1.

W. FOULIS.
Gas-Governor.

No. 197,842. Patented Dec. 4, 1877.

Witnesses
Chas. J. Gooch
W. R. Edilen.

Inventor:
William Foulis
By Knights Bro
Attorneys

2 Sheets—Sheet 2.

W. FOULIS.
Gas-Governor.

No. 197,842. Patented Dec. 4, 1877.

Witnesses
Chas. J. Gooch
W. R. Edelen.

Inventor.
William Foulis
By Knight Bros
Attorneys

UNITED STATES PATENT OFFICE.

WILLIAM FOULIS, OF GLASGOW, NORTH BRITAIN.

IMPROVEMENT IN GAS-GOVERNORS.

Specification forming part of Letters Patent No. 197,842, dated December 4, 1877; application filed August 16, 1877.

*To all whom it may concern:*

Be it known that I, WILLIAM FOULIS, of Glasgow, in the county of Lanark, North Britain, civil engineer, have invented a new and Improved Gas Governor or Regulator, of which the following is a specification:

The invention relates to a new arrangement or construction of regulator or governor for regulating the distribution of gas, and is adapted to be used as a station-governor or a district-governor.

The improvement consists in a vertical cylindrical casing, closed at both ends, and having, some distance below the top, a horizontal division, provided with an opening, which constitutes the valve-seat of the governor proper. The gas-inlet to the regulator or governor is situated below this horizontal division or valve-seat, and the gas-exit above it. The cylindrical vessel is partially immersed in water contained in the outer casing, and is provided with a float at bottom; or, in place of such float, it may have an equivalent counter-weight. The upper part of this vessel constitutes the valve, which, when in its lowest position, closes the opening or valve-seat. The portion of this vessel immediately below the valve is formed of two conical frusta, whose larger ends are of the diameter of the vessel itself, the smaller ends being united, thereby forming a triangular annular space or chamber, which is surrounded by, and contained within, the continuation or extension of the cylindrical vessel. This extension of the casing of the cylindrical vessel has formed in it a number of vertical slits, through which the gas not only passes into the triangular space, but these slits also constitute the passage for the gas from the lower to the upper part of the governor. The double conical form of this part provides sufficient space for the gas to pass through, and at all times prevents the equilibrium of the governor from being disturbed by the pressure of the inlet gas.

That portion of the casing hereinbefore described as having slits in it may be dispensed with; and instead of forming the upper part of the vessel of two conical frusta, as described, it may be formed with an annular space or chamber whose transverse section is either rectangular or curved. A small pipe is provided for the purpose of connecting the space beneath the valve—namely, that which is inclosed by the valve, the cylindrical casing, and the liquid in which it floats—either with a gas-inlet or with the atmospheric air, or with both, or for the purpose of connecting the interior of the vessel both with the inlet and outlet.

Figure 2:
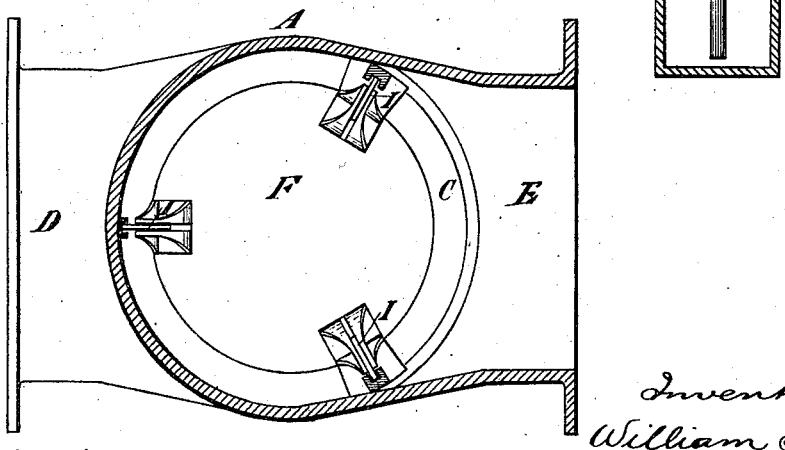
Figure 3:
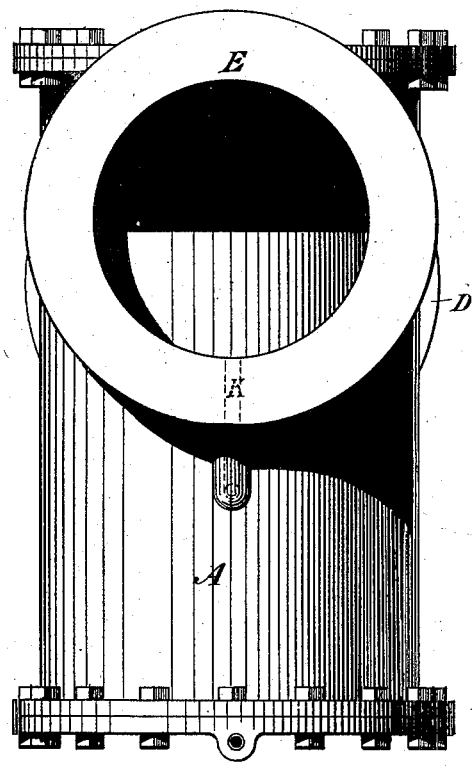
Figure 4:
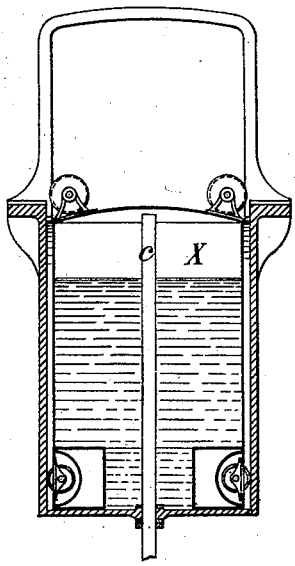

In the accompanying drawings, Figure 1 is a vertical section of the improved governor or regulator. Fig. 2 is a plan thereof, partly in section. Fig. 3 is an elevation of the outlet at right angles to Fig. 1. Fig. 4 is a vertical section of the preferred device for controlling the action of the governor.

A represents an outer cylindrical casing, closed at both ends, and having formed upon it, a short distance below the top, a division, B, provided with a circular opening therein; and upon it is fixed, by means of bolts, another ring, C, which constitutes the valve-seat of the governor proper, or the part B may alone form the valve-seat. Immediately underneath the valve-seat C there is formed on the casing A a branch, D, for the admission or inlet of the gas to the interior of the casing; and above the valve-seat a branch, E, is situated for the exit of the gas which has passed from the under to the upper side of the valve-seat C.

The governing part of the apparatus consists of a cylindrical vessel, F, partially immersed in water contained in the outer casing A, and constructed at its lower end with a hollow space or float, G; or, instead of having such float, it may be provided with an equivalent counter-weight attached to a rod (not shown in the drawings) proceeding upward from the top of the vessel F through a stuffing-box in the upper cover of the casing. The top or cover *a* of this vessel F constitutes the valve, which, when shut down upon its seat C, prevents the passage of the gas from the under to the upper side of the valve C. The upper part of the vessel F—that is to say, the part immediately beneath the cover or valve *a*—is formed of two conical frusta, as shown at Fig. 1, whose larger ends are of the diameter of the vessel itself, the smaller ends being united, thereby forming a triangular annular chamber or space, H, which is surrounded by and contained within the extension of the vessel F. This extension of the vessel F has formed in it slits or openings b, which not only allow the gas, as it comes through the inlet-branch D, to pass into the triangular space H, but, also, when the valve a is raised from its seat C. These slits b afford sufficient space for allowing the gas to pass from the inlet to the outlet side of the casing A, and by confining the gas in the space H, so that it cannot flow out from the portion of the slits on the upper side of the valve-seat as quickly as it enters them on the lower side, the pressure in the chamber H is thereby maintained sensibly uniform, so that it acts equally on both the upper and lower frusta in all positions. That portion of the vessel F hereinbefore described as having slits in it may be dispensed with, and instead of forming the upper part of the vessel of two conical frusta, it may be formed with an annular space, whose transverse section is either rectangular or curved.

The small pipe c is that which is provided for the purpose of connecting the interior of the inclosed space beneath the valve either with gas or with the atmosphere, thereby enabling the vessel to be controlled in different ways.

The method of controlling the action of the vessel which I prefer to employ is shown in Fig. 4. It consists in connecting the small pipe c with the interior of the bell X, and continuing it above the water-line in the vessel or chamber wherein the bell X is contained.

By placing weights upon the bell X, the gas or air contained therein, as well as in the pipe c and the interior of the governor, is compressed, and causes the governor to rise or open, and in this way any required pressure may be obtained.

Anti-friction rollers I are placed at the interior of the casing A, for the purpose of guiding the vessel in its rise and fall.

A passage, K, forms means of communication between the outlet and the interior of the casing A, so as to allow any moisture which may collect in the outlet to run off.

A small well, L, is placed in the pipe c, for the purpose of collecting any moisture which may collect in the pipe.

The action of the governor or regulator is as follows: When the small pipe connects with the atmospheric air, the pressure in that space is necessarily that of the atmosphere. The outlet-pressure, acting upon the top of the valve or cylindrical vessel alone, influences its action relatively with the amount of floating power or counter-weight. When a counter-weight is used, the valve is provided with a spindle, which passes through a stuffing-box in the top cover of the governor, to which spindle the counter-weight is attached by a lever or chain. When the small pipe is connected to the inlet or to any independent source of gas-supply, provided that the pressure in the inlet or that source of gas-supply is constant and greater than outlet-pressure required, and also that this communicates with the external atmosphere after the manner in which an analogous pipe communicates with the external atmosphere in the governor of M. Giroud, and described by M. Giroud in his work entitled "De la Pression de Gaz d' Éclairage, et de Moyens à Employer pour la Regulariser," published in Paris in 1872, a stop-cock placed upon the pipe between the inlet or independent source of gas-supply and the governor, or on the pipe leading the controlling gas out from the governor to the atmosphere, will control the outlet-pressure of the governor by regulating the pressure on the interior of the floating or counterweighted portion of the governor, which pressure acts upward against the downward pressure on the outlet side of the governor.

If the small pipe is connected to the inlet of the governor, the inlet-pressure will control the outlet-pressure from the governor, depending on the floating power or counter-weights, and in this case the difference between the inlet and outlet pressure is constant.

When the areas of the interior and exterior of the governor are different, the difference of pressure is in a constant ratio.

When the aforesaid space is connected both with the inlet and outlet, the outer pressure is indirectly variable with the inlet-pressure, and may be regulated by the extent of opening of a stop-cock placed on the pipe leading from the inlet to the interior of the governor.

Another method of controlling the action of the governor is by shutting up a fixed quantity of air or gas in the said space, and connecting this space, and therefore the air or gas in it, by means of a small pipe to the interior of a floating and weighted bell placed at any distance from it, as shown in Fig. 4.

Having thus described my invention, the following is what I claim as new and desire to secure by Letters Patent:

1. The cylinder F, having annular chamber H, and forming a valve, in combination with a gas-regulator, as and for the purpose set forth.

2. The cylinder F, forming a valve, a, in combination with a casing, A, having valve-seat B, as and for the purpose set forth.

3. The gas regulator or governor consisting of casing A, having inlet D and exit E, cylinder F, intermediate of the inlet and exit, and valve-seat B, as and for the purpose set forth.

In testimony whereof I have signed my name to this specification in the presence of two subscribing witnesses.

WILLIAM FOULIS.

Witnesses:
DAVID D. AUSTIN,
CORNELIUS HOPE.